March 3, 1942.                J. EMMERICH                2,274,827
                              BEADING MACHINE
                           Filed Feb. 24, 1940          3 Sheets-Sheet 1

INVENTOR
JULIUS EMMERICH
BY
ATTORNEY

March 3, 1942.  J. EMMERICH  2,274,827
BEADING MACHINE
Filed Feb. 24, 1940  3 Sheets-Sheet 2
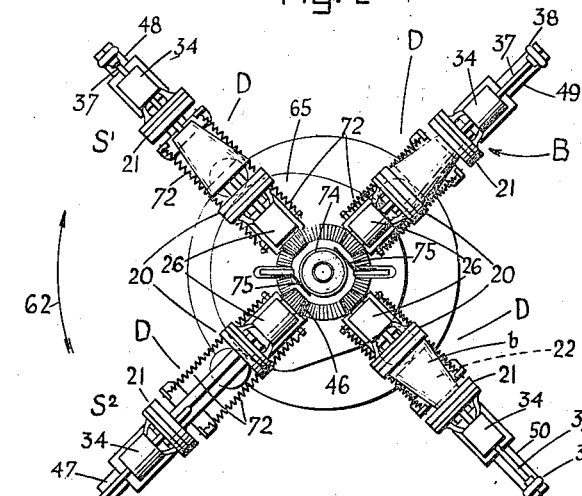
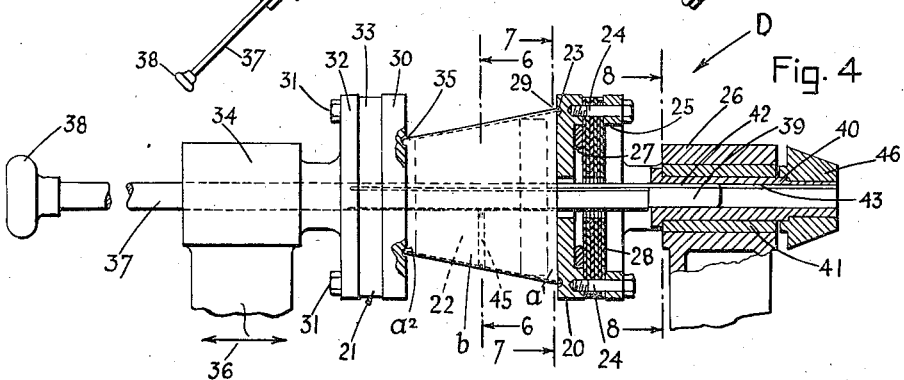
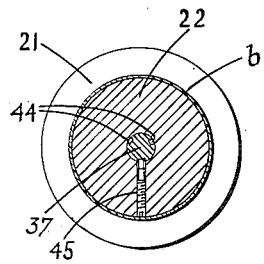
Fig. 6
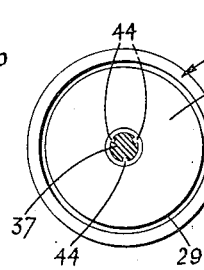
Fig. 7
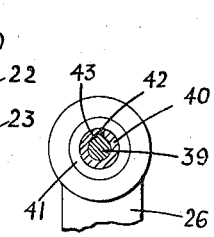
Fig. 8
INVENTOR
JULIUS EMMERICH
BY
ATTORNEY March 3, 1942.  J. EMMERICH  2,274,827
BEADING MACHINE
Filed Feb. 24, 1940  3 Sheets-Sheet 3
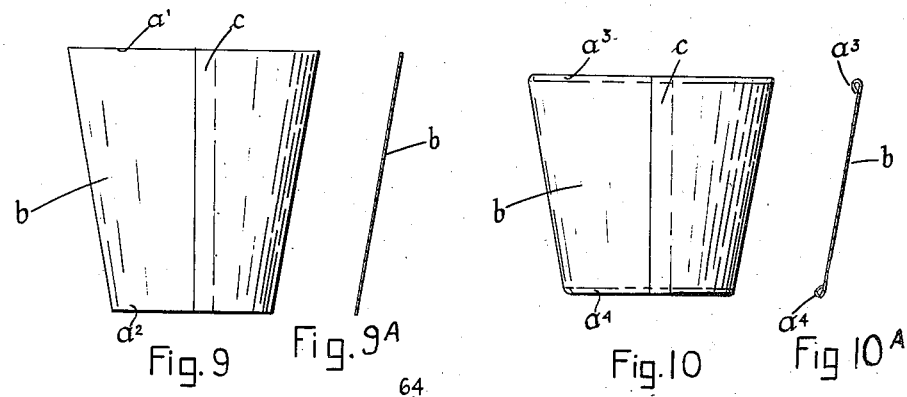
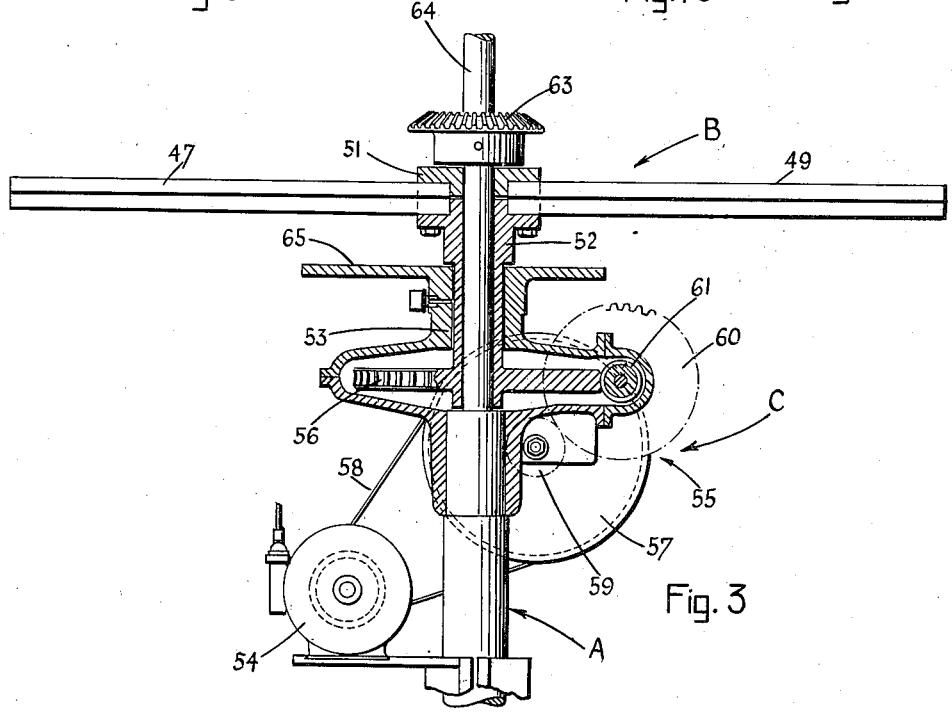
INVENTOR
JULIUS EMMERICH
BY
ATTORNEY Patented Mar. 3, 1942

2,274,827

UNITED STATES PATENT OFFICE 2,274,827

BEADING MACHINE

Julius Emmerich, Newark, N. J., assignor to A. L. Siegel Co., Inc., Newark, N. J., a corporation of New York Application February 24, 1940, Serial No. 320,572

13 Claims. (Cl. 18—19)

This invention relates to a beading apparatus and has special reference to the provision of an apparatus for thermoplastically beading the edge or edges of tubular container bodies and the like which are made of a plastic or thermoplastic material.

In beading the edge walls of tubular bodies made of a plastic such as a cellulosic material, particularly where the body walls are relatively thin and fragile, it is difficult, whether hand or machine operated equipment is used, to obtain a curl or bead which is uniform in dimensions and appearance. Where it is desired to simultaneously bead the opposite edge walls of the tubular plastic body, the difficulties multiply due to the introduced distortion stresses that are applied to the walls of the tubular body. The operation of heating and curling the edge walls into bead formation is relatively time-consuming, and hence when either hand methods or unit bead machines are used, the operations are relatively slow and costly.

The prime object of my present invention centers about the provision of a beading apparatus, for beading tubular container bodies and the like which are made of a plastic or thermoplastic material, constructed and designed (1) to produce beads which, to a high degree, are uniform in dimensions and appearance, (2) to produce simultaneously beads on the opposite edge walls of the tubular body without introducing any distorting stresses on the body walls and, therefore, in which the integrity of the body walls, even though very thin and fragile, is maintained, and (3) to enable a number of tubular bodies to be beaded at the same time and in sequential order, producing thereby a machine capable of high speed and quantity production.

To the accomplishment of the foregoing and such other objects as may hereinafter appear, the invention further consists in the structural combinations hereinafter sought to be defined in the claims and described more in detail hereinbelow in connection with the appended drawings, in which:

Figure 2 is a top plan view thereof;

Figure 3 is a fragmentary view taken on an enlarged scale, with parts shown in section showing the main operating mechanism of the apparatus;

Figure 4 is a view taken on an enlarged scale, with parts shown in section of one of the beading units of the apparatus;

Figures 6, 7 and 8 are cross-sectional views taken, respectively, in the planes of the lines 6—6, 7—7 and 8—8 of Figure 4;

Figure 9 are views showing the tubular container body prior to a beading or curling operation; and Figure 10 is a view showing the tubular container body after a beading or curling operation.

Figure 1:
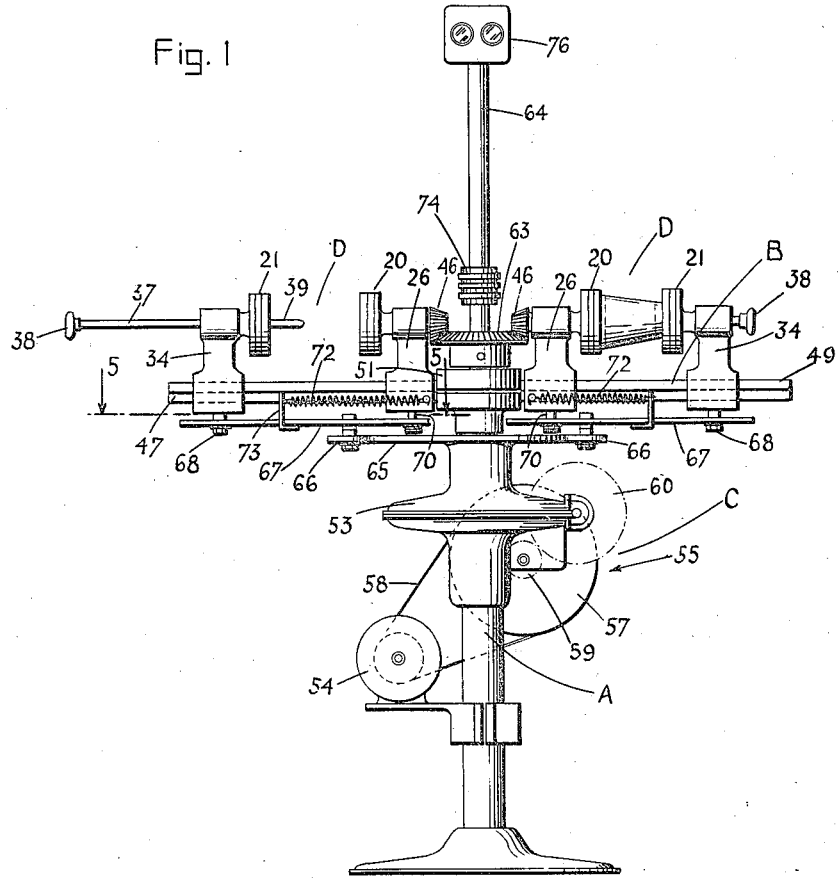
Figure 1 is a vertical elevational view of the beading apparatus of my invention.
Figure 5:
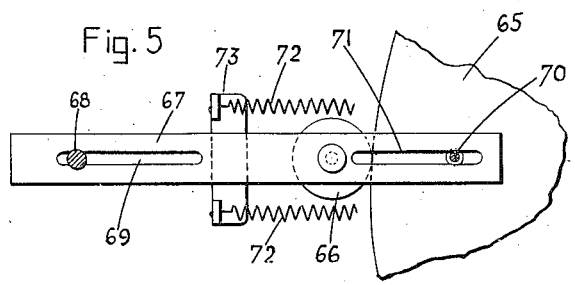
Figure 5 is an enlarged fragmentary view taken in section in the plane of the line 5—5 of Figure 1.

Referring now more in detail to the drawings and having reference first to Figures 1 and 2 thereof, the beading apparatus comprises in its general assembly a machine standard or support generally designated as A, a movable or rotatable turret generally designated as B, the operating mechanism C therefor, and a plurality of beading units D, D, as, for example, four in number, mounted on said turret B, each beading unit being movable from a charging station S' to a discharging station $S^2$ (see Figure 2) as the turret B is rotated in the direction indicated by the arrow in Figure 2 of the drawings, each of the beading units D, D being designed and constructed so that a complete beading operation takes place as the unit is moved through a complete cycle between the charging and discharging stations.

The more generic principles of the invention may be explained by reference to the cycle of operation of one of the beading units D, and such a unit is best shown in Figure 4 of the drawings supplemented by Figures 6 to 8. With this may be considered Figures 9 and 10 of the drawings, wherein is exemplified the character of the work performed by the beading apparatus. The apparatus of the present invention is intended particularly to thermoplastically bead the opposite edge walls $a'$ and $a^2$ of a tubular body such as a container body $b$ made of a plastic or thermoplastic material such, for example, as a cellulosic substance. The body $b$ is made from relatively thin cellulosic sheets, the side edges of which are joined as at $c$ to produce a tubular body which may have any desired cross-sectional contour but which is shown as a frustro-conical or tapered, this being one of the many forms to which the invention is applicable. The wall of the tubular body $b$ is thus relatively thin and fragile, rendering it difficult to produce curls or beads at the opposite wall edges $a'$ and $a^2$ which are uniform in dimensions and appearance. By means of the beading apparatus of the present invention, these opposite edge walls $a'$ and $a^2$ are thermoplastically curled preferably simultaneously to produce the very uniform beads $a^3$ and $a^4$ best depicted in Figure 10 of the drawings.

A beading unit apparatus for accomplishing this, as shown in Figure 4 of the drawings, comprises two spaced beader heads 20 and 21 both fixed against rotation, the said beader heads being relatively movable in an axial direction, a rotatable mandrel 22 arranged between the beader heads for holding the tubular container body $b$ with its opposite edge walls $a'$ and $a^2$ exposed for treatment (the mandrel having a surface configuration corresponding to so as to closely fit the interior configuration of the tubular body $b$), combined with means for simultaneously rotating said mandrel 22 and axially moving said beader heads 20 and 21, one relatively to the other, for simultaneously curling or beading the said opposite edge walls $a'$ and $a^2$ of the tubular body $b$.

Both beader heads 20 and 21 comprise heated units and preferably electrically heated units. The beader head 20 comprises a beader face plate 23 secured as by means of bolts 24 to the supporting plate 25 of a stationary head stock 26, the said face plate being heated by means of an electrical resistance unit 27 housed therein, the face plate and heater unit being insulatably mounted from the mounting plate 25 by means of the heating insulation 28. The face plate 23 of the beader head defines a heater die, the surface of which is provided with an annular beading groove 29. The beader head 21 is similarly provided with a beader face plate 30 supported by means of the bolts 31, 31 on a supporting plate 32 and heat insulatably mounted therefrom by heat insulating means 33, the supporting plate 32 forming part of a head stock 34. The face plate 30 also defines a heater die and is provided with the annular beading groove 35. The relatively axial movement of the beader heads 20 and 21 is obtained by fixedly mounting the head stock 26 and movably mounting the opposite head stock 34 axially in the directions indicated by the double headed arrow 36. The rotatable mandrel 22 is mounted so that it also has a free axial movement; and, consequently, when the mandrel 22 is rotated and the head stock 34 is moved axially towards the head stock 26, the beader heads are moved towards each other so that the beader grooves 29 and 35 are rotatably engaged gradually and progressively by the edge walls $a'$ and $a^2$ of the tubular container body $b$, resulting in the simultaneous curling of these edge walls and the production of the beads $a^3$ and $a^4$. By holding the beader heads against rotation and by rotating the mandrel 22, the opposite edge walls of the tubular container body are simultaneously acted upon in the same rotative direction and in opposite longitudinal directions as the opposite body edge walls are gradually and progressively forced into the annular grooves of the heated face plates 23 and 30. The result is that the beads on the opposite edge walls are produced without introducing any distorting stresses on the walls of the tubular body, and, therefore, the integrity of the body walls, even though very thin and fragile, is maintained and beads are produced which, to a high degree, are uniform in dimensions and appearance.

To charge the machine with a container body to be beaded and to discharge the beaded container body, the mandrel 22 is made removably mountable. To this end, the beader unit is provided with a spindle 37 arranged coaxially with the beader heads and axially movable relative thereto, said spindle being for this purpose slidably mounted in the beader head 21 and its head stock 34 and being provided at one end with a handle 38, the other end 39 being receivable in the bore of a shaft 40 which is rotatably mounted in a bushing 41 in the fixed head stock 26. At the end 39, the spindle 37 is provided with a key 42 receivable in a keyway 43 formed in the bore of the shaft 40 (see Figures 4 and 8). Intermediate its ends, the spindle 37 is provided with a plurality of keyways 44 (as, for example, three in number), any of which is adapted to receive a screw formed key member 45 inserted radially in the mandrel 22 (see Figures 4, 6 and 7). With this construction, the machine may be charged and discharged as follows: When the head stock 34 is in its outermost position, a mandrel 22 with a tubular body $b$ thereon is slid over the free end 39 of the spindle, after which the spindle 37 is then moved inwardly so that its free end 39 is coupled to the shaft 40. The parts are then ready for a beading operation. After a beading operation, the head stock 34 is again in its outermost position and the reverse sliding movement of the spindle 37 first uncouples its free end from the shaft and then permits the mandrel (with the attached beaded body) to be removed. When the machine is operated, the spindle 37 is rotated by the shaft 40, the shaft being provided with a miter pinion 46.

In the preferred construction of the beading machine, I provide a plurality of these beading units D, D, the machine being designed and constructed so that a number of tubular bodies may be beaded at the same time and in sequential order, producing thereby a machine capable of high speed and quantity production. Such a machine is shown in organized assembly in Figures 1 and 2 of the drawings. In this exemplification, four beading units are shown. All of the beading units are mounted on the rotatable turret B, the rotatable turret comprising four radially directed rail members 47, 48, 49 and 50 secured at their inner ends to the hub 51 of a vertically disposed and rotatable sleeve unit 52 (see Figure 3), which latter is rotatably mounted in a casing or housing 53 fixedly secured to the standard or support A of the machine. The beader heads 20 and 21 of each unit D are mounted on the rail members of the turret, each head stock 26 being fixedly secured to its turret rail and each head stock 34 being mounted on its turret rail for slidable movement thereon, that is to say, for radial movement on the turret.

The operating mechanism of the machine comprises a motor 54 suitably supported on the standard A and reduction gearing generally designated as 55 connecting the motor with a worm gear 56 (see Figure 3) which is secured to the sleeve unit 52 of the turret B, the reduction gearing comprising a belt wheel 57 connected by means of the belt 58 to the motor, the wheel pinion 59, the gear 60 meshing therewith, and the worm 61 meshing with the worm wheel 56. It will be obvious that this operating mechanism C effects the rotation of the turret B and causes each of the beading units D to move between the stations $S'$ and $S^2$ in the direction indicated by the arrow 62 in Figure 2, through a complete operating cycle.

It is in the rotation of the turret and during the movement of a beading unit through a revolution that the beader heads are moved axially one relatively to the other, and that the mandrel is rotated all in the manner above described. These different operations are all accomplished by the rotation of the turret.

To effect rotation of all of the mandrels 22, I provide a sun gear 63 fixed to a vertical rod 64, which latter is fixedly secured to or forms part of the machine standard A (see Figure 3). With this sun gear 63 mesh all of the miter gears 46, 46, which latter act as planet gears when the turret B is rotated. It will, therefore, be seen that when the turret is rotated, movement of the planetary gears 46 around the sun gear 63 will cause rotation of the shafts 40 and the spindles 37 when the latter are coupled to the shafts.

To effect the movement of the head stocks 34, I provide a fixed part of the machine such as the casing 53 with a cam 65, and I provide each of the movable head stocks 34 with a cam follower 66 secured to a connecting plate 67, to which connecting plate the head stock 34 is adjustably fixed as by means of a bolt 68. The connecting plate 67 is provided with a slot 69 for this adjustment, and the bolt 68 is carried by the underneath portion of the head stock 34. The connecting plate 67 may be also suitably guided by a headed bolt 70 depending from the fixed head stock 26, this bolt being received by the slot 71 at the contiguous end of the connecting plate 67. Double acting cams may be provided, but if a single acting cam is used as shown, the return movement is effected by means of springs 72, 72 anchored at one end to a fixed part of the machine such as the head stock 26 and at the other end to a member 73 which is affixed to the connecting plate 67. By means of this construction, it will be seen that as the turret B, with its rails 47 to 50, is rotated, the engagement of the cam followers 66 with the fixed cam 65, together with the action of the springs 72, causes the axial (or radial) movement in opposite directions of the head stocks 34 relatively to the fixed head stocks 26.

For connecting the electrical heating units 27 of the heated beader heads 20 and 21 to an energy source, the rod standard 64 of the machine may be provided with an element 74 providing contact rings with which cooperate the brushes 75, 75 suitably mounted on a part of the turret B. The machine may also be provided with a flash indicating means 76 thermostatically connected to the electric circuits for indicating the temperature condition of the heaters in the beader heads.

The operation of the machine may be briefly explained by reference to Figures 2 and 4 of the drawings. The machine may be operated so that the turret is rotating continuously, or, if desired, the machine may be stopped for every charging and discharging operation. The machine is charged at or before the station S' when the beader head 21 and the spindle 37 are in their outermost positions. To charge the machine, a mandrel 22 (with a container tube b thereon) is placed between the beader heads 20 and 21 and the spindle 37 is moved inwardly, the advance end 39 thereof first threading through the mandrel 22 and then into, for coupling with the shaft 40. As the turret B rotates, the charged beader unit D moves in the arrowed direction 62. The planet gear 46 of this unit moves around the fixed sun gear 63 causing the rotation of the shaft 40, the spindle 37 coupled thereto, and the mandrel 22 rotatably fixed to the spindle. The cam follower 66 is operated by the fixed cam 65 during this turret rotation, to move the beader head 21 axially towards the beader head 20, resulting in the simultaneous rotative engagement of the tubular body edge walls $a'$, $a^2$ with the beader grooves of the said beader heads 20 and 21, the mandrel 22 having a free axial movement on the spindle 37 to permit of this simultaneous engagement. The cam 65 is contoured as shown in Figure 2 of the drawings, to permit of the gradual and progressive curling of the body edge walls; and as indicated in Figure 2, the beading action takes place as the turret is moved over substantially half of its revolution. During the remainder of the revolution of the turret, the beader head 21 moves away from the beader head 20 and thus frees the mandrel so that as the turret is moved through the last quarter of its revolution and into the discharging position $S^2$, the operator may grasp the handle 38 and slide the spindle 37 outwardly so as to first disengage the same from the continuously rotating shaft 40 and to then remove from the spindle the mandrel 22 carrying the now beaded tubular body $b$. The machine is thus continuously operated with a number of tubular bodies being beaded at the same time in sequential order, enabling production on a quantity basis.

It will be obvious that many changes may be made in the construction of the machine and the arrangement of parts, without departing from the principles of the invention defined in the following claims.

I claim:

1. An apparatus for beading tubular bodies or the like comprising, a rotatable turret, means for rotating the turret, a plurality of beading units mounted on said turret each movable between charging and discharging stations, each of said beading units comprising two spaced beader heads, one fixed and the other radially movable on the turret, a rotatable mandrel for holding a tubular body with its edge walls exposed, the rotatable mandrel being axially movable to and from the fixed beader head, and means for rotating said mandrel and for moving the radially movable beader head during the rotation of said turret for causing rotative engagement of the exposed edge walls of the tubular body against the beader heads for curling or beading the same, the said last mentioned means comprising driving elements arranged at the axis of said turret.

2. The apparatus of claim 1 in which the last mentioned means comprises a central support, sun gear on the support, a coacting planetary gear for each mandrel on the turret, a fixed cam on the support and a cam follower for each radially movable beader head on the turret.

3. An apparatus for beading tubular bodies or the like comprising, a support, a rotatable turret thereon, means for rotating the turret, a plurality of beading units mounted on said turret each movable between charging and discharging stations, each of said beading units comprising a beader head fixed against rotation and radially movable on the turret, a rotatable mandrel for holding a tubular body with one of its edge walls exposed, the said rotatable mandrel and the beader head being movable in an axial direction one relatively to the other, and means for rotating said mandrel and for relatively moving axially the mandrel and the beader head during the rotation of said turret for causing rotative engagement of the exposed edge wall of the tubular body against the beader head for curling or beading the said exposed body edge wall, said last mentioned means comprising a sun gear on said support, a coacting planetary gear for each mandrel on the turret, a fixed cam on the support and a cam follower for each movable beader head on the turret.

4. An apparatus for beading opposite edges of tubular bodies comprising, two spaced beader heads, one beader head being fixed and the other being movable axially to and from the fixed beader head, a rotatable spindle coaxial with said beader heads, a mandrel mounted on and rotatable with said spindle between said beader heads adapted to hold a tubular body with its opposite edge walls exposed, the said mandrel being movable axially towards the fixed beader head and being so moved by the movable beader head, means for rotating said spindle and means for moving said axially movable beader head for simultaneously beading the opposite edge walls of the tubular body.

5. An apparatus for beading opposite edges of tubular bodies comprising, two spaced beader heads, one beader head being fixed and the other being movable axially to and from the fixed beader head, a rotatable spindle coaxial with said beader heads, a mandrel removably mounted on and rotatable with said spindle between said beader heads adapted to hold a tubular body with its opposite edge walls exposed, the said mandrel being movable axially towards the fixed beader head and being so moved by the movable beader head, means for rotating said spindle and means for moving said axially movable beader head for simultaneously beading the opposite edge walls of the tubular body.

6. An apparatus for beading opposite edges of tubular bodies comprising, two spaced beader heads, one beader head being fixed and the other being movable axially to and from the fixed beader head, a rotatable spindle coaxial with the beader heads and axially movable relative thereto, a mandrel removably mounted on and rotatable with said spindle between said beader heads adapted to hold a tubular body with its opposite edge walls exposed, the said mandrel being movable axially towards the fixed beader head and being so moved by the movable beader head, means adjacent the fixed beader head for driving said mandrel, axial movement of said spindle effecting the coupling and uncoupling of the same to said driving means and permitting the removability of said mandrel, and means for moving said axially movable beader head for simultaneously beading the opposite edge walls of the tubular body.

7. An apparatus for beading opposite edges of tubular bodies comprising, two spaced beader heads fixed against rotation, electrical means for heating said beader heads, one beader head being fixed and the other being movable axially to and from the fixed beader head, a rotatable spindle coaxial with said beader heads, a mandrel mounted on and rotatable with said spindle between said beader heads adapted to hold a tubular body with its opposite edge walls exposed, the said mandrel being movable axially towards the fixed beader head and being so moved by the movable head, means for rotating said spindle and means for moving said axially movable beader head for simultaneously beading the opposite edge walls of the tubular body.

8. An apparatus for beading tubular bodies comprising, a fixed beader head, a rotatable spindle coaxial with the beader head and axially movable relatively thereto, a mandrel removably mountable on said spindle for rotation therewith and for axial movement thereon to and from said beader head, axial movement of the spindle permitting the removable mountability of said mandrel, the said mandrel being adapted to hold a tubular body with one edge wall exposed, means for rotating said spindle and means for axially moving the mandrel to cause rotative engagement of the exposed edge wall of the tubular body against the beader head for beading the exposed body edge wall.

9. An apparatus for beading tubular bodies comprising, a fixed beader head, a rotatable spindle coaxial with the beader head and axially movable relatively thereto, a mandrel removably mountable on said spindle for rotation therewith and for axial movement thereon to and from said beader head, the said mandrel being adapted to hold a tubular body with one edge wall exposed, means adjacent the fixed beader head for driving said spindle, axial movement of said spindle effecting the coupling and uncoupling of the same to said driving means and permitting the removable mountability of said mandrel, and means for axially moving the mandrel to cause rotative engagement of the exposed edge wall of the tubular body against the beader head for beading the exposed body edge wall.

10. An apparatus for beading tubular bodies comprising, a fixed beader head, a rotatable spindle coaxial with the beader head and axially movable relatively thereto and therethrough, a mandrel removably mountable on said spindle for rotation therewith and for axial movement thereon to and from said beader head, axial movement of the spindle permitting the removable mountability of said mandrel, the said mandrel being adapted to hold a tubular body with one edge wall exposed, means at the outside of said beader head for driving said spindle, axial movement of said spindle through the beader head effecting the coupling and uncoupling of the same to said driving means, and means for axially moving the mandrel to cause rotative engagement of the exposed edge wall of the tubular body against the beader head for beading the exposed body edge wall.

11. An apparatus for beading opposite edges of tubular bodies comprising a turret, means for rotating the turret, a plurality of beading units mounted radially on said turret each movable between charging and discharging stations, each of said beading units comprising two spaced beader heads relatively movable in an axial direction radially of said turret, a rotatable mandrel arranged between the beader heads for holding a tubular body with its opposite edge walls exposed, a spindle coaxial with said beader heads on which the rotatable mandrel is mounted and operative for rotating the said mandrel, means adjacent the axis of said turret for driving said spindle, and means for axially moving said beader heads one relatively to the other during the rotation of said turret for simultaneously beading the said opposite edge walls of the tubular body as the beader unit is moved between the charging and discharging stations.

12. An apparatus for beading opposite edges of tubular bodies comprising a turret, means for rotating the turret, a plurality of beading units mounted radially on said turret each movable between charging and discharging stations, each of said beading units comprising a fixed beader head, a rotatable spindle coaxial with the beader head and axially movable relatively thereto, a mandrel removably mountable on said spindle for rotation therewith and for axial movement thereon to and from said beader head, axial movement of the spindle permitting the removable mountability of said mandrel, the said mandrel being adapted to hold a tubular body with one edge wall exposed, means adjacent the axis of said turret for driving said spindle, and means for axially moving the mandrel during the rotation of said turret for causing the rotative engagement of the exposed edge wall of the tubular body against the beader head for beading the same as the beader unit is moved between the charging and discharging stations.

13. An apparatus for beading opposite edges of tubular bodies comprising a turret, means for rotating the turret, a plurality of beading units mounted radially on said turret each movable between charging and discharging stations, each of said beading units comprising a fixed beader head, a rotatable spindle coaxial with the beader head and axially movable relatively thereto, a mandrel removably mountable on said spindle for rotation therewith and for axial movement thereon to and from said beader head, the said mandrel being adapted to hold a tubular body with one edge wall exposed, means adjacent the axis of said turret for driving said spindle, axial movement of said spindle effecting the coupling and uncoupling of the same to said driving means and permitting the removable mountability of said mandrel, and means for axially moving the mandrel to cause rotative engagement of the exposed edge wall of the tubular body against the beader head as the beader unit is moved between the charging and discharging stations.

JULIUS EMMERICH.